(12) United States Patent  (10) Patent No.: US 8,102,069 B2
Steelman  (45) Date of Patent: Jan. 24, 2012

(54) WATER POWERED ELECTRICITY GENERATING DEVICE

(76) Inventor: Gerald Erwin Steelman, Adel, IA (US)

( * ) Notice: Subject to any disclaimer, the term of this patent is extended or adjusted under 35 U.S.C. 154(b) by 554 days.

(21) Appl. No.: 12/275,325

(22) Filed: Nov. 21, 2008

(65) Prior Publication Data

US 2010/0127501 A1    May 27, 2010

(51) Int. Cl.
*F03B 13/00* (2006.01)
(52) U.S. Cl. ............................. 290/54; 290/44
(58) Field of Classification Search .................. 290/43, 290/44, 54, 55
See application file for complete search history.

(56) References Cited

U.S. PATENT DOCUMENTS

| | | | |
|---|---|---|---|
| 3,887,817 A * | 6/1975 | Steelman | 290/43 |
| 3,911,287 A * | 10/1975 | Neville | 290/53 |
| 3,924,827 A | 12/1975 | Lois | |
| 3,984,698 A | 10/1976 | Brewer | |
| 4,021,140 A | 5/1977 | Weisbrich | |
| 4,054,031 A | 10/1977 | Johnson | |
| 4,124,182 A * | 11/1978 | Loeb | 244/153 R |
| 4,151,424 A * | 4/1979 | Bailey | 290/54 |
| 4,313,059 A * | 1/1982 | Howard | 290/54 |
| 4,329,593 A * | 5/1982 | Willmouth | 290/44 |
| 4,364,709 A | 12/1982 | Tornquist | |
| 4,516,033 A * | 5/1985 | Olson | 290/54 |
| 6,254,034 B1 | 7/2001 | Carpenter | |
| 6,498,402 B2 * | 12/2002 | Saiz | 290/55 |
| 6,555,931 B2 | 4/2003 | Mizzi | |
| 7,188,808 B1 | 3/2007 | Olson | |
| 7,275,719 B2 | 10/2007 | Olson | |

FOREIGN PATENT DOCUMENTS

| | | |
|---|---|---|
| FR | 2756016 A1 | 5/1998 |
| SE | 1295024 A | 3/1987 |
| WO | 2007031800 A1 | 3/2007 |

* cited by examiner

*Primary Examiner* — Quyen Leung
*Assistant Examiner* — Naishadh Desai
(74) *Attorney, Agent, or Firm* — McKee, Voorhees & Sease, P.L.C.

(57) ABSTRACT

The present invention relates to an apparatus for providing electrical energy from a flowing stream of water by capturing the flowing stream and transferring the captured energy to a rope which passes through a plurality of rotors connected to an electricity generator.

11 Claims, 3 Drawing Sheets

WATER POWERED ELECTRICITY GENERATING DEVICE

BACKGROUND OF THE INVENTION

There is a growing demand for alternative forms of energy production which utilize renewable sources of energy to produce useable electrical or other energy. Solar panels and wind turbines are in growing demand, but do not provide base power because the energy supply (sun or wind) is not constantly available. Therefore, in order to utilize energy produced from solar panels or wind turbines, the energy must be stored in some form of battery.

One form of energy which is renewable and in constant supply is energy from flowing water. Flowing water provides a constant energy source with high torque and generally low speed. There have been other attempts to produce energy from this source, such as my previous U.S. Pat. No. 3,887,817. As systems such as the one described in my '817 patent are scaled for greater production, however, previously unforeseen issues arise.

One such issue is the high stress placed on the rope or chain. In a single rotor system, such as described in my '817 patent, the rope experiences a high tension differential between entering and leaving the rotor. This results in premature wear of the rope, leading to system failure and down time.

Therefore, it is a primary purpose of this invention to provide an apparatus which is able to extract useable amounts of energy from a flowing stream of water and convert it into useable energy, such as electricity.

It is a further purpose of this invention to provide an apparatus which is able to scale from experimental to useful scales without significant modification.

It is a still further purpose of this invention to provide an apparatus designed to gradually reduce the tension in the rope so as to eliminate premature wear.

BRIEF SUMMARY OF THE INVENTION

The invention generally relates to an apparatus for producing electricity from a flowing stream of water. The apparatus is generally mounted on a boat, pontoon, or other floating platform which is secured relative to the shore such that the water flow passes by the floating platform. A rope, chain, or other flexible loop member is lowered into the water stream and a plurality of cups, parachutes, or other momentum exchange device adapted to provide linear force to the continuous loop member from the flowing stream of water. The continuous loop member is threaded through a plurality of rotors, the rotors transferring the linear force to rotational force for use by an electricity generator.

A plurality of rotors is required to provide a gradual stepping off of the tension on the continuous loop member. This provides that the tension is distributed over a longer length of the continuous loop member, reducing the strain and eliminating the potential for premature wear or failure. The tension differential between any two rotors varies based on their position relative to the point where the continuous loop member picks up force. Each rotor will therefore rotate at different rates, the rotational energy will then be captured by the generator and transformed into electrical potential.

DETAILED DESCRIPTION OF THE PREFERRED EMBODIMENT

The invention will now be described with reference to the numerals in the attached figures.

Figure 1:
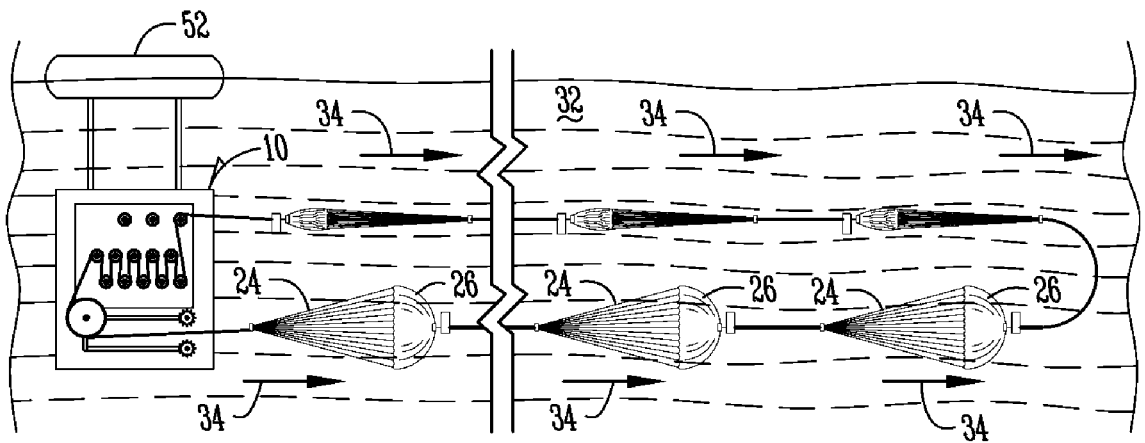
FIG. 1 shows a top view of the preferred embodiment of the invention.

As shown in FIG. 1, the invention generally comprises a continuous loop rope 20 having a number of parachutes 26 positioned at points along the rope 20. The rope 20 is positioned into a water source 32 having a current 34. The parachutes 26 are designed to automatically open and close in order to capture the force of the current 34 and provide linear force to the rope 20. The rope 20 passes through a number of rotors 18 positioned on a frame 12, the rotors 18 transferring the linear motion of the rope 20 to rotary motion. The rotors 18 are connected to a generator 50 to produce electricity. The frame 12 is preferably mounted on a floating device 52, such as a pontoon or raft. The pontoon or raft 52 is anchored relative to the current 34.

Figure 2:
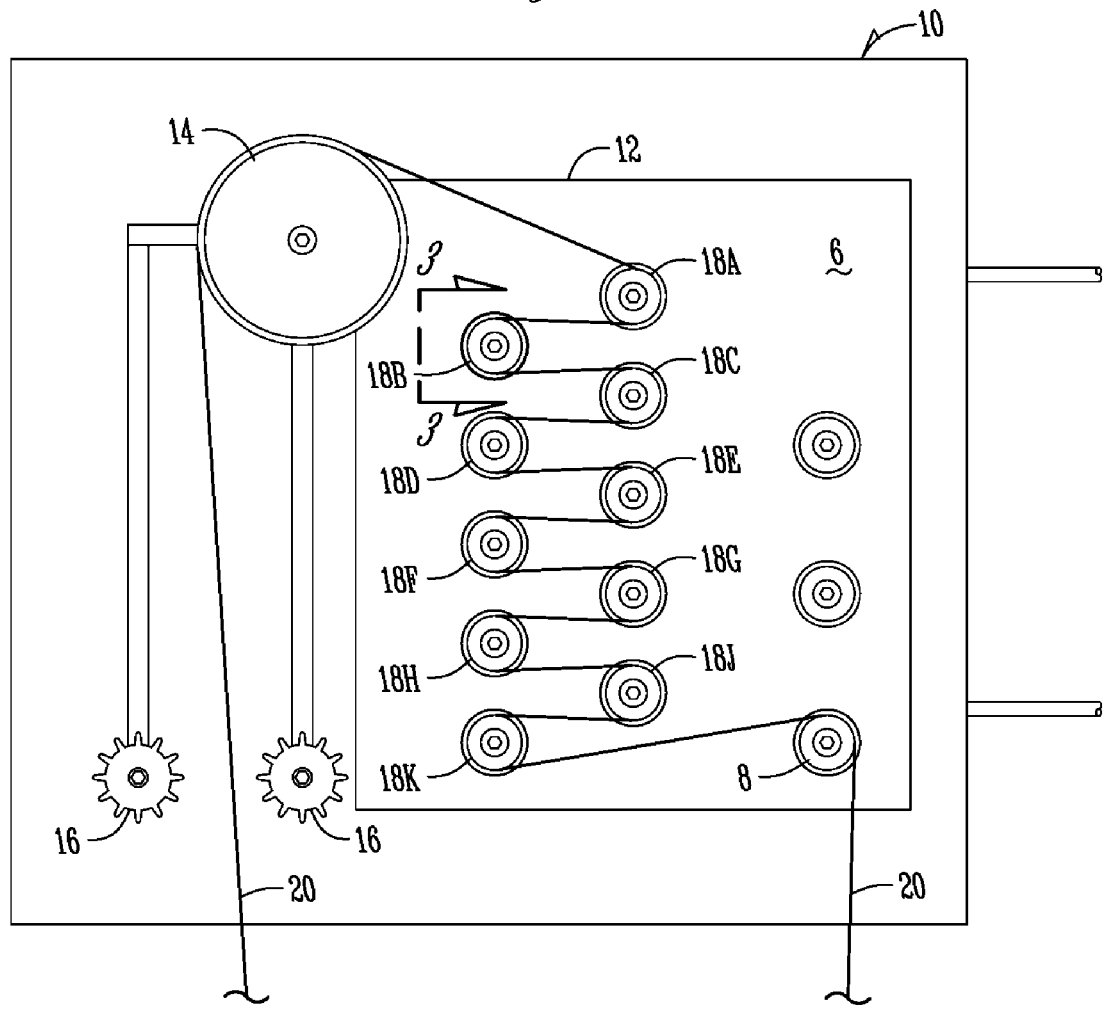
FIG. 2 shows an enlarged top view of the preferred embodiment.
Figure 3:
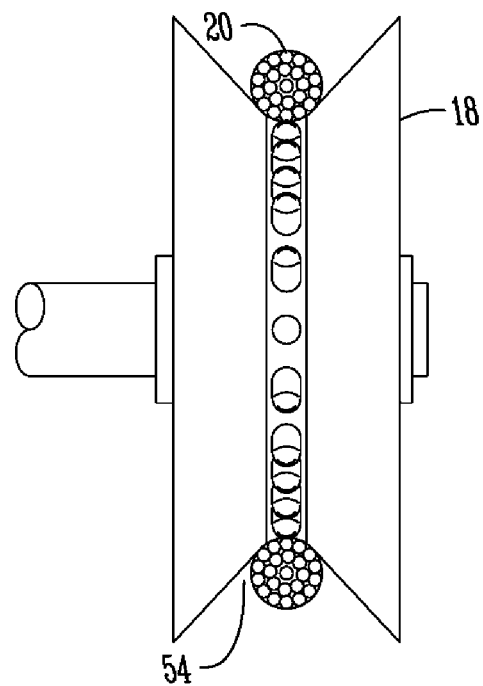
FIG. 3 shows a side view of one rotor taken along line 3-3.

As shown in FIG. 2, the frame 12 has a plurality of rotors 18 arranged thereon. As shown in FIG. 3, each rotor 18 has a tapered cleavage 54 for receiving a continuous loop rope 20. The rope 20 passes through each rotor, and as a force is applied to the rope 20, the rotors 18 are caused to turn. Preferably, the rotors are arranged so that the rope 20 engages each rotor 18 over half its circumference, thereby maximizing the amount of power extracted from the moving rope 20. The plurality of rotors 18 are engaged with an electricity generator 50.

As shown in FIG. 3, the rotors 18 are arranged in a pair of rows. The rotors are staggered and positioned such that the rope 20 engages each rotor 18 over approximately half of its circumference. The frame 12 also features a pair of guide wheels 16 positioned adjacent the trailing edge of the frame 12. These guide wheels ensure that the rope 20 does not drift in the current 34. Guide wheel 8 is located near the downstream portion of frame 12 to control the lateral movement and to guide the rope 20 out of the water and into the plurality of rotors 18.

A pair of elongated horizontal rollers are located at the extreme downstream portion of frame 12 adjacent guide wheels 16 and 8. These rollers operate on the top side and in contact with the rope 20 to control the vertical angle of entry and exit of rope 20 into guide wheels 16 and 8. The horizontal rollers feed rope 20 directly into the cleavage of guide wheels 16 and 8 to ensure that the rope 20 does not become disengaged during operation in large ocean waves. Thus, with guide wheels 16 and 8 and the two horizontal rollers, the lateral and vertical angles of attack of the rope 20 into the rotors 18 are controlled.

Shield 6 serves as a cover or shroud to prevent any portion of the rope 20 to rise above the cleavage 54 in rotors 18 or the cleavage in any guide wheel 8, 14. The cleavage 54 is the only portion of rotors 18 or any guide wheel 8, 14 to extend through and below the shield 6 to prevent the entanglement of the rope 20 or parachutes 26 with any moving parts. Shield 6 extends throughout and immediately above any area where the rope 20 operates, the only thing below the cleavage 54 is water.

A large pulley 14 is positioned at the leading edge of the frame 12 for guiding the rope 20 into the plurality of rotors 18 and to space the rope 20 away from the rotors, reverse the direction of the rope 20 from an upstream direction into a downstream direction that allows the water current 34 to begin filling the open end 28 of the parachute 26 for another power cycle of the continuous loop rope 20. The pulley 14 provides for aligning the rope 20 vertically and ensuring it enters the rotors 18 at a proper angle.

Figure 4:
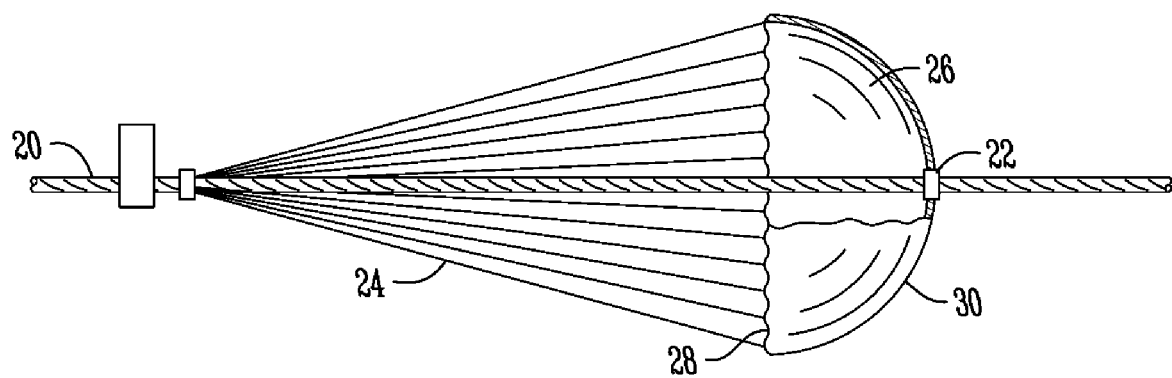
FIG. 4 shows an enlarged view of a momentum exchange device.

FIG. 4 shows the parachute 26, or momentum exchange device, mounted to the rope 20. The rope 20 features a number of attachment points 22 positioned about its length. At each of these attachment points is a parachute 26. Each parachute 26 has an open end 28 and a closed end 30, and a number of lines 24 extending from the parachute towards the open end 28. The lines 24 attach to the rope 20, and transfer force generated by the parachute 26 to the rope 20. The lines 24 also ensure that the parachute 26 remains open when the open end 28 faces the current and closed when the closed end 30 faces the current.

As can be appreciated by those skilled in the art, as the rope 20 is pulled taut by the current 34 working on the parachutes 26, the rope 20 tends to stretch. The rope 20 is stretched by the force differential acting along the length. The rope 20 experiences a maximum tension $T_{max}$ at the guide wheels 16 as the rope enters the water 32, and a minimum tension $T_0$ as the rope leaves the water 32 near the pulley 8. As viewed in FIG. 2, the rope 20 travels in a counterclockwise direction during operation, although the device 10 may be configured to operate in the opposing direction. Each rotor 18 reduces the amount of tension in the rope 20 as energy is extracted. For example, as the rope 20 passes rotor 18A, the tension drops from $T_{max}$ to $T_A$. The tension differential across the rotor 18A can be expressed as $T_A - T_{max}$, the "loss" of tension is caused by energy being transferred to the rotor 18A. As the rope 20 passes the other rotors 18B-J, the tension drops steadily to $T_0$. It is further well known in the art that the rope 20 will experience a spring-like deformation, the deformation measured according to the force acting on any section of the rope 20. The difference in tension across any of rotors 18A-K will vary, resulting in variable deformation of the rope as it traverses rotors 18A-K. As a consequence, each rotor 18A-K will tend to rotate at a different rotational velocity according.

Figure 5:
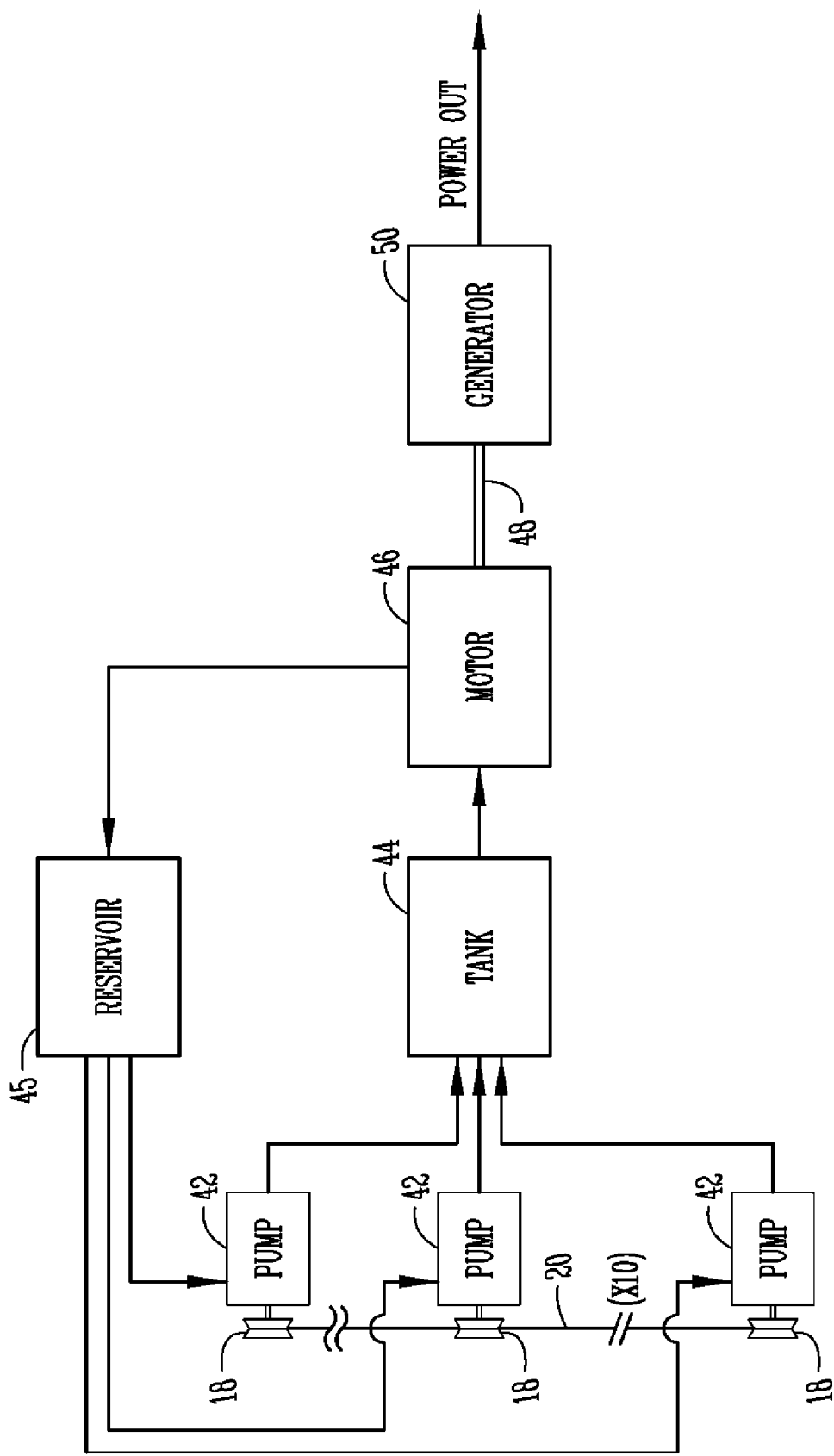
FIG. 5 shows a schematic of the power generator.

FIG. 5 shows a preferred example of a generator intended to capture the energy from each of the rotors 18. A hydraulic piston pump 42 is attached to each of the rotors 18. Each hydraulic piston pump 42 provides a variable flow rate at a constant pressure, depending on the rotational velocity of the assigned rotor 18. The hydraulic piston pumps 42 feed pressurized hydraulic fluid into a common pressurized reservoir tank 44 through a series of interconnecting tubes. This pressurized tank 44 is operably connected to a hydraulically driven motor 46 adapted to utilize pressurized hydraulic fluid to drive a shaft 48 on a generator 50. The generator 50 produces electricity according to means commonly known in the art. After driving the motor 46, unpressurized hydraulic fluid is returned to a reservoir 45.

The hydraulic system as described provides for a means of normalizing the energy output from a plurality of rotors 18 rotating at different speeds. Other means for producing electricity from the plurality of rotors may be utilized. Some examples include: a plurality of hydraulic pumps operating in series with a constant flow rate; mechanical gearing; independent generators on each rotor; or any other method commonly known in the art.

The system as shown includes ten rotors 18 arranged such that the rope 20 contacts approximately half of the circumference of each rotor 18. The number of rotors is not fixed, and may be varied according to need. The principle consideration in choosing the number of rotors is to ensure that the rope does not slip as it passes through the rotors. Rope slippage leads to wear and results in premature failure of the system. Because the rope 20 is an essential structural element, replacing the rope 20 requires power generation to be halted.

Ideally, the plurality of rotors 18 are of a uniform diameter. However, rotors 18 may vary in size in order to eliminate the difference in rotational velocity between any two rotors 18. Ideally, no rotor 18 will have a diameter of less than eight times the diameter of the rope 20. The ratio of 8:1 between rotor diameter and rope diameter is one which is commonly used in the art. This ratio reduces energy losses due to bending the rope about the rotor and prevents slippage of the rope.

The rotors additionally feature a cleavage 54 for receiving the rope 20. This cleavage is a tapered opening which ensures that the rope 20 does not slip from the rotor 18. The tapered cleavage 54 also allows the parachute 26 and lines 24 to pass through the rotor 18 without tearing, creasing, or becoming entangled. Additionally, because the rotors 18 are coplanar with one another and the rope 20 passes through each rotor 18 only once, the parachutes 26 and lines 24 may hang below the rotors 18 and avoid entangling with other parachutes 26 or lines 24. Other rollers or guides may also be present, the guides lifting, directing, or raising the rope 20 out of the water source 32. This may be necessary if the frame 12 is elevated from the water source 32.

The above description is intended to be exemplary in nature and not limit the invention. Any limitations appear in the allowed claims.

What is claimed is:

1. An apparatus for generating electricity comprising:
   a continuous loop member;
   a plurality of momentum transferring devices attached to said continuous loop member, said plurality of momentum transferring devices adapted to capture flow from a fluid stream and transfer it to linear work on said continuous loop member;
   a plurality of rotors each having a cleavage adapted to receive said continuous loop member and translate said linear force to rotational work, said plurality of rotors operably connected to an electricity generating device;
   a mechanism adapted to receive input from each of said plurality of rotors and produce electricity;
   said mechanism comprising a plurality of pumps corresponding to and operably connected to said plurality of rotors, a pressure tank, and a hydraulic engine.

2. The apparatus of claim 1 wherein said pumps are hydraulic piston pumps.

3. The apparatus of claim 1 further wherein said momentum transferring devices comprises an open end and a closed end, said open end adapted to receive said fluid and transfer work to said continuous loop member, said closed end adapted to reduce drag on said momentum transferring device in said fluid stream.

4. The apparatus of claim 3 wherein said momentum transferring devices comprise a parachute.

5. The apparatus of claim 4 wherein said parachute has an edge and a plurality of lines extending from said edge towards said open end, said lines intersecting with said continuous loop member.

6. The apparatus of claim 5 wherein said parachute further comprises a plurality of floats and weights attached to said lines and said edge, said plurality of floats and weights for controlling said parachute depth relative to said fluid stream.

7. The apparatus of claim 1 wherein said frame further comprises a plurality of rollers for guiding said continuous loop member.

8. The apparatus of claim 7 wherein at one of said rollers comprises a horizontal roller having an axis parallel said frame, said horizontal roller for lifting said continuous loop member from said fluid stream.

9. The apparatus of claim 8 wherein at least one of said rollers comprises a guide roller having an axis perpendicular said frame, said guide roller controlling lateral movement of said continuous loop member.

10. The apparatus of claim 1 wherein the continuous loop member travels in a plane among the plurality of rotors.

11. An apparatus for generating electricity comprising:
a continuous loop member;
a plurality of momentum transferring devices attached to said continuous loop member, said plurality of momentum transferring devices adapted to capture flow from a fluid stream and transfer it to linear work on said continuous loop member which is moveable in a loop in only one direction;
a plurality of rotors each having a cleavage adapted to receive said continuous loop member and translate said linear force to rotational work, said plurality of rotors operably connected to an electricity generating device;
a mechanism adapted to receive input from each of said plurality of rotors and produce electricity; and
said rotors being so arranged that said continuous loop member engages approximately half of the cleavage of each said plurality of rotors.

* * * * *